US006593414B2

(12) United States Patent
Benton et al.

(10) Patent No.: US 6,593,414 B2
(45) Date of Patent: Jul. 15, 2003

(54) PRESSURE SENSITIVE ADHESIVES

(75) Inventors: Kenneth C. Benton, Cedar Rapids, IA (US); Yakov A. Letuchy, Iowa City, IA (US); Edward G. Ludwig, Jr., Iowa City, IA (US); James M. Quarles, Cedar Rapids, IA (US)

(73) Assignee: Penford Corporation, Bellevue, WA (US)

( * ) Notice: Subject to any disclaimer, the term of this patent is extended or adjusted under 35 U.S.C. 154(b) by 0 days.

(21) Appl. No.: 09/909,222

(22) Filed: Jul. 19, 2001

(65) Prior Publication Data

US 2002/0161102 A1 Oct. 31, 2002

Related U.S. Application Data

(60) Provisional application No. 60/224,083, filed on Aug. 9, 2000.

(51) Int. Cl.$^7$ .................................................. C08L 3/00
(52) U.S. Cl. ................... 524/502; 524/501; 524/387; 524/388; 524/376; 524/377; 524/378; 524/571; 524/575
(58) Field of Search ................. 524/109, 389, 524/501; 527/300, 313, 312, 314; 428/532, 535

(56) References Cited

U.S. PATENT DOCUMENTS

| | | | | | |
|---|---|---|---|---|---|
| 3,095,391 A | * | 6/1963 | Brockway et al. | ......... | 260/17.4 |
| 3,598,623 A | * | 8/1971 | Powers et al. | ............... | 106/214 |
| 3,664,912 A | * | 5/1972 | Olson | ......................... | 161/161 |
| 4,192,783 A | * | 3/1980 | Bomball et al. | ................ | 260/8 |
| 4,301,017 A | * | 11/1981 | Klightlinger et al. | ........ | 252/8.6 |
| 4,328,269 A | * | 5/1982 | Korpman | ..................... | 428/40 |
| 4,588,762 A | * | 5/1986 | Mruk et al. | ................... | 524/45 |
| 4,690,996 A | * | 9/1987 | Shih et al. | ................... | 527/312 |
| 4,775,706 A | * | 10/1988 | Iovine et al. | ................. | 524/47 |
| 4,977,252 A | * | 12/1990 | Chiu | .......................... | 536/102 |
| 5,003,022 A | | 3/1991 | Nguyen et al. | ............. | 527/300 |
| 5,130,395 A | * | 7/1992 | Nguyen et al. | ............. | 527/300 |
| 5,190,818 A | * | 3/1993 | Sakai | .......................... | 428/355 |
| 5,356,963 A | * | 10/1994 | Kauffman et al. | ............ | 524/43 |
| 5,416,181 A | | 5/1995 | Nguyen et al. | ............. | 527/300 |
| 5,525,414 A | * | 6/1996 | Wagers et al. | .............. | 428/265 |
| 5,536,764 A | * | 7/1996 | Nguyen et al. | ............... | 524/53 |
| 5,536,778 A | * | 7/1996 | Kreckel et al. | ............. | 524/733 |
| 5,565,509 A | * | 10/1996 | Nguyen et al. | ................ | 524/47 |
| 5,591,489 A | * | 1/1997 | Dragner et al. | ............. | 427/364 |
| 5,753,468 A | * | 5/1998 | Henley | ........................ | 435/95 |
| 5,945,468 A | * | 8/1999 | Atkinson et al. | ............. | 524/51 |
| 6,040,379 A | | 3/2000 | Luebke et al. | .............. | 524/734 |

FOREIGN PATENT DOCUMENTS

| JP | 52-74648 | * | 12/1975 | ........... C08L/11/02 |
|---|---|---|---|---|
| JP | 6-264038 A | * | 9/1994 | .............. C09J/7/02 |
| JP | 7-18232 A | * | 1/1995 | .............. C09J/7/02 |

OTHER PUBLICATIONS abstract (in English) for JP 6–264038.*

* cited by examiner

*Primary Examiner*—David W. Wu
*Assistant Examiner*—Rip A Lee
(74) *Attorney, Agent, or Firm*—Marshall, Gerstein & Borun

(57) ABSTRACT

Pressure sensitive adhesive compositions comprising (a) a synthetic polymer latex; and (b) an aqueous dispersion of thinned, derivatized starch are disclosed.

17 Claims, 1 Drawing Sheet

PRESSURE SENSITIVE ADHESIVES

This application claims the benefit of U.S. Provisional Patent Application Serial No. 60/224,083, filed Aug. 9, 2000, the disclosure of which is hereby incorporated by reference.

BACKGROUND OF THE INVENTION

The present invention is generally directed to adhesives and more specifically to pressure sensitive adhesives such as are used in self-adhesive labels and tapes. Pressure sensitive adhesives include general purpose pressure sensitive adhesives and removable pressure sensitive adhesives and typically comprise styrene-butadiene rubber (SBR) or acrylic copolymers. In particular, the invention is directed to the use of starches including enzyme thinned starches in combination with styrene-butadiene rubber or acrylic copolymers as components of pressure sensitive adhesives.

The use of carbohydrates in adhesive formulations is well known. Since ancient times, starches and natural gums have been used as adhesives; current applications include "library paste," photograph and print mounting adhesives, and wallpaper adhesives. They offer the advantages of being derived from renewable resources, are basically non-toxic, and are benign in the environment. While such adhesives serve adequately in their traditional applications, they are relatively inconvenient to use due to their slow-drying solvent (water), which may cause damage to the substrate. Their applications are also limited due to their lack of inherent tackiness, limited strength and lack of flexibility.

While synthetic polymers are of more recent origin, they have been used in adhesive formulations for nearly a century. They offer many advantages over the natural carbohydrate adhesives. There exists a wide variety of chemically-different structures which can be specifically tailored to provide a balance of properties such as strength, flexibility, resistance to heat, cold, and chemicals, and to accommodate a wide variety of application techniques. Their disadvantages include the fact that they are usually petroleum-based products and, thus, are derived from a non-renewable resource. Moreover, they often include solvents and other components that are not benign in the environment, and they may interfere with the recycling of paper and other materials.

While combinations of starch and synthetic SBR latices are well known in the adhesive art, their use as components of peelable pressure sensitive adhesives has been problematic. By peelable pressure sensitive adhesive is meant an adhesive which provides reliable but temporary adhesion. Further, by peelable pressure sensitive adhesive is also meant that the adhesive will maintain its peelability over time periods of weeks or months and not become irreversibly bound to a substrate. In particular, it has been extremely difficult for the art to formulate compositions that provide reliable adhesive strength with subsequent peelability. One solution to this problem is presented by Sakai, U.S. Pat. No. 5,190,818 which describes an adhesive composition comprising an aqueous latex emulsion in combination with starch particles and fine particles of silica gel having particle sizes smaller than the average particle diameter of the starch particles. Nevertheless, there remains a desire in the art for alternative pressure sensitive adhesive compositions utilizing SBR or acrylic latices in combination with significant amounts of a renewable carbohydrate component, such as starch, but not requiring the use of a relatively expensive component such as silica gel.

SUMMARY OF THE INVENTION

The present invention provides compositions relatively benign to the environment, that are easily cleaned and removed from equipment and substrates using non-hazardous solvent and are less likely to interfere with the recycling of paper and plastic materials.

The present invention is directed to the combination of a thinned derivatized starch with a synthetic polymer latex in producing a pressure sensitive adhesive. According to a preferred aspect of the invention, the pressure sensitive adhesive is peelable. While the thinned derivatized starch may be thinned according to any of a number of means it is preferably an enzyme thinned starch. The thinned starch preferably has an average molecular weight of from 360 to 50,000 daltons with a molecular weight of greater than 1,134 daltons being preferred.

Preferred thinned derivatized starches according to the invention are those in which the thinned derivatized starch is substituted with a member selected from the group consisting of alkyl, hydroxyalkyl, allyl, aryl, arylalkyl, carbonyl, carboxylic acid, phosphate, and quartenary amine groups with hydroxyalkyl and particularly hydroxyethyl and hydroxypropyl modification being preferred.

While a wide variety of synthetic polymer latices are useful according to the invention those having a glass transition temperature of less than 0° C. are preferred with those of less than −20° C. being particularly preferred. Particularly useful synthetic latices include those selected from the group consisting of a styrene-butadiene copolymer latex, a carboxylated styrene-butadiene copolymer latex, an acrylic copolymer latex, a styrene-acrylic copolymer latex, and a vinyl acetate-acrylic copolymer latex.

According to one aspect of the invention the thinned derivatized starch comprises from 5 to 50 percent by weight on a dry solids basis of the total adhesive composition with from 10 to 40 percent being preferred and 12 to 30 percent being more preferred.

The peelable pressure sensitive adhesives of the invention optionally further comprise one or more additional ingredients including starch copolymer compositions as well as tackifying resins, surfactants, defoamers, rheology modifiers, antioxidants, biocides, fungicides, fragrances and the like, in specified proportions to produce aqueous dispersions that achieve the desired adhesive properties. According to one aspect of the invention the adhesive composition comprises up to 35 percent by weight of tackifier resins. According to another preferred aspect of the invention the adhesive composition comprises up to 2.0 percent by weight of one or more surfactants. Preferred adhesive compositions of the invention further comprise up to 1.0 percent by weight of defoamers and optionally up to 4 percent by weight of a crosslinker.

While a variety of adhesive types can be prepared by this approach, for example, remoistenable adhesives, the invention is particularly directed toward pressure sensitive adhesives. The exact properties of the resulting adhesive product can be controlled by the selection of the type of components and their ratio.

DETAILED DESCRIPTION

Figure 1:
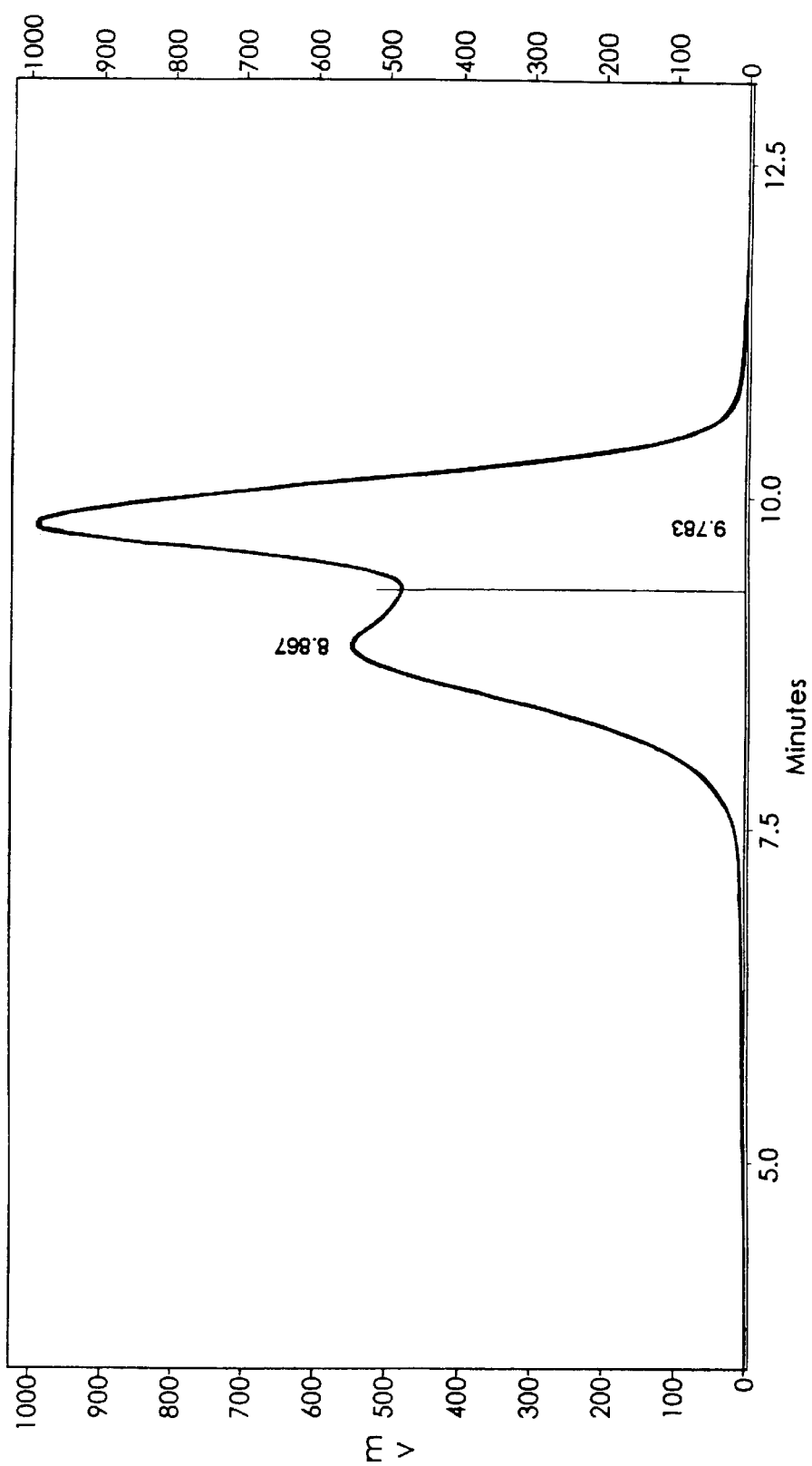
FIG. 1 depicts an HPLC plot of the molecular weight distribution of a preferred enzyme thinned hydroxyethyl-derivatized starch.

The derivatized starches used in practice of the invention may be derived from a number of starch sources. Sources of starch useful in practice of the invention include, but are not limited to, corn, rice, wheat, potato, tapioca, banana and amaranth starches. While starches are preferred for use according to the invention it is contemplated that other thinned derivatized carbohydrate sources including gums and cellulosic materials may also be used in practice of the invention. The starches may be thinned according to a variety of means known to the art including by acid, oxidative or enzymatic hydrolysis and combinations of those procedures. A particularly preferred starch for use in the invention is the α-amylase thinned starch identified later as 4415C.

A derivatized starch is a starch in which at least a fraction of the anhydroglucose units have one or more hydroxyl groups substituted with alkyl, hydroxyalkyl, arylalkyl, allyl, carboxyalkyl, carboxylic ester, phosphate, alkylsilyl, or quartenary ammonium groups, and the like, or a combination thereof. More specifically, preferred derivatized starches are those in which a fraction of its anhydroglucose units is substituted with hydroxyethyl, hydroxypropyl, hydroxybutyl, hydroxybutenyl, carboxymethyl, carboxylic ester or 2-hydroxy-(3-trimethylammmonium)propyl groups, followed by reducing the molecular weight through acid, oxidative, or enzymatic hydrolysis, oxidative cleavage, or by other means, such as mechanochemical and ultrasonic irradiation. Most preferably, the specialty starch is an enzyme-modified hydroxyethyl or hydroxypropyl starch having at least 1.5 weight percent alkylene oxide units with at least 60 weight percent of the starch chains having a degree of polymerization in the range of 7 to 700 (molecular weight of 1,152 to 113,418 daltons). Typically, the thinned derivatized starch comprises from about 10% to about 35%, and preferably from about 12% to about 30% by weight of the total adhesive formulation solids.

The synthetic latex may be any of a wide variety of latices with styrene-butadiene latex, optionally a carboxylated styrene-butadiene latex, styrene-acrylic latex, acrylic copolymer latex, and vinyl-acrylic copolymer latices being preferred. Preferably, the latex is carboxylated styrene-butadiene latex, styrene-acrylic latex, or acrylic copolymer latex having a glass transition temperature of less than 0° C. and weight-average molecular weight of less than 500,000 daltons. The synthetic latex typically comprises from about 30% to about 80% by weight of the formulation solids with levels of 40% to 60% being preferred.

The starch copolymer product is defined broadly as the product of a polymerization reaction of starch (including derivatized starches, modified starches, modified and derivatized starches as well as other non-starch carbohydrate products including cellulose products and derivatized and modified cellulose products as well as gums and hydrocolloids) with synthetic monomers such as described in U.S. Pat. Nos. 5,003,022 and 5,416,181. Preferred starch copolymers include a styrene-butadiene-starch copolymer, a styrene-acrylic-starch copolymer, an acrylic-starch copolymer or a vinyl acetate-acrylic copolymer. The type of copolymer latex used to formulate the adhesive determines the type of copolymer to be used. The copolymer typically comprises from about 2% to about 25%, and preferably from about 2% to about 18% by weight of the formulation solids. However, the starch copolymer may also replace the thinned derivatized starch and the synthetic polymer latex in some formulations. The starch copolymer serves to improve the compatibility of the thinned derivatized starch with the synthetic polymer latex, as well as to modify the adhesive properties of the composition. As one aspect of the invention it has been found that the incorporation of a starch copolymer composition improves the compatibility of the starch and synthetic polymer latex components of the adhesive compositions and greatly increases the stability of the adhesive compositions.

Alternatively, the thinned derivatized starch in combination with the synthetic copolymer itself may comprise the bulk of the adhesive composition. Thinned derivatized starch-synthetic copolymers suitable for use as the main adhesive binder are those in which the thinned derivatized starch comprises from 5 to 40 percent by weight of the copolymer, and preferably from 10 to 30 percent by weight. The copolymer then comprises up to 75 percent by weight of the total adhesive composition.

Such copolymers are readily prepared by polymerizing at least one vinyl monomer in the presence of the thinned derivatized starch and, optionally, an anionic or non-ionic surfactant, according to the processes described in U.S. Pat. No. 5,003,022 and U.S. Pat. No. 6,040,379. Vinyl monomers are selected from the group comprising acrylic and methacrylic acids and their $C_1$ to $C_{18}$ alkyl, cycloalkyl, alkylaryl and aryl esters, amides, and N-substituted amides, conjugated and non-conjugated dienes, and vinyl aromatic compounds, and mixtures thereof. Preferred vinyl monomers are acrylic and methacrylic acids and their methyl, ethyl, n-propyl, i-propyl, n-butyl, s-butyl, t-butyl, t-amyl, 2-ethylhexyl, n-octyl, t-dodecyl, cyclohexyl, benzyl, and phenyl esters, ethylene glycol dimethacrylate, acrylamide, N-t-butyl acrylamide, N-t-octyl acrylamide, N,N-dimethylacrylamide, N-methylol acrylamide, 1,3-butadiene, 2-methyl-1,3-butadiene, 2,3-dimethyl-1,3-butadiene, 2-chloro-1,3-butadiene, 1,4-hexadiene, acrylonitrile, styrene, α-methylstyrene, 4-methylstyrene, 4-t-butylstyrene, isoprene, itaconic acid, m-isopropenyldimethylbenzyl isocyanate, N-methylol acrylamide and the like, and mixtures thereof. More preferred vinyl monomers are acrylic and methacrylic acids, methyl acrylate, ethyl acrylate, n-butyl acrylate, 2-ethylhexyl acrylate, t-dodecyl acrylate, ethylene glycol dimethacrylate, N,N-dimethylacrylamide, N-methylol acrylamide, 1,3-butadiene, 2-methyl-1,3-butadiene, acrylonitrile, styrene, p-methylstyrene, p-t-butylstyrene, and the like, and mixtures thereof. Preferred copolymers include a methyl methacrylate-2-ethylhexyl acrylate copolymer and a methyl methacrylate-2-ethylhexyl acrylate-butyl acrylate terpolymer. The most preferred vinyl monomers are acrylic and methacrylic acids, n-butyl acrylate, 2-ethylhexyl acrylate, methyl methacrylate, ethylene glycol dimethacrylate, N-methylol acrylamide, 1,3-butadiene, styrene, and mixtures thereof.

The compositions may also include one or more tackifying resins, to control tack, peel, and shear strength. The selection of tackifying resins is based on the choice of synthetic polymer latex composition and the balance of properties desired; they are used in amounts that are typical in the industry and known to those skilled in the art. Typically, the tackifier resins comprise from about 10% to about 50%, preferably from about 15% to about 35% of the formulation solids.

Optionally, the compositions of this invention may include surfactants, defoamers, thickeners, latent crosslinkers and other functional compounds. These are well known in the art and need not be described in detail here. These components typically comprise less than 5% of the formulation solids.

The following examples are illustrative and are not intended as limiting either the scope or spirit of the invention.

EXAMPLE 1

Preparation of a Thinned Derivatized Starch

About 338 g of PenFilm™ HV hydroxyethyl-derivatized corn starch (Penford Products Co.) having about 2.5 wt. % ethylene oxide units are dispersed in about 500 g of softened water. About 390 mg of α-amylase dispersion are added, and the slurry is heated at about 180° F. while agitating, until the desired molecular weight is obtained. The reaction is terminated by the addition of sufficient hydrochloric acid to reduce the pH of the solution to about 1.0, thereby destroying the enzyme. The pH is then adjusted to about 7.0 with sodium hydroxide, and the thinned derivatized starch paste is cooled to ambient temperature.

EXAMPLES 2 THROUGH 8

The following Examples 2 through 8 illustrate the preparation of several simple pressure sensitive adhesive (PSA) compositions through the blending of selected thinned derivatized starches with a SBR latex and tackifier. The formulations, and their corresponding adhesive properties, are shown in Table 1.

EXAMPLE 2

The required amount of Butofan® NS 222, a carboxylated SBR latex available from BASF Corporation, was weighed into a 4-oz. plastic cup. A sufficient quantity of the thinned derivatized starch enzyme-thinned PenFilm™ HV No. 421182 prepared according to the procedure of Example 1 to comprise 13.2 weight percent of the total formulation was added dropwise while mixing the latex with a small marine propeller at 500–600 rpm. After mixing for 10 minutes, the Snowtack® SE780G tackifier (available from Eka Chemicals Canada, Inc.) was added dropwise, with agitation. The composition was mixed for an additional 5 minutes to ensure thorough blending of the components, and was then allowed to stand at ambient conditions for at least 10 minutes.

Films were cast on 2-mil Mylar® sheet using a K Control Coater with the #6 grooved rod. The films were dried for about 2–5 minutes at 80° C., cooled to ambient temperature, and covered with a silicone release paper sheet. The sheets were conditioned for at least 16 hours at about 72° F. and 50% relative humidity. The shear strength (½"×½" sample, 500-g weight) and 180° peel strength were determined.

EXAMPLE 3

Example 3 was prepared according to the procedure of Example 2, except that the amount of the thinned derivatized starch was increased such that it comprised 19.7 percent by weight of the formulation solids.

EXAMPLE 4

Clearsol® 10 oxidized corn starch (Penford Products Co.) was dispersed in softened water and cooked at about 180–190° F. for about 15–20 minutes to produce a starch paste of about 22% ds. The paste was cooled to ambient temperature. A pressure sensitive adhesive composition and adhesive test sheets were prepared according to the procedure of Example 2. The Clearsol 10 comprised 14.0 weight percent of the total formulation solids.

EXAMPLE 5

Penford® Gum 380 hydroxyethyl corn starch was dispersed in softened water and cooked at about 180–190° F. for about 15–20 minutes to produce a starch paste of about 24.7% ds. The paste was cooled to ambient temperature. A pressure sensitive adhesive composition and adhesive test sheets were prepared according to the procedure of Example 2. The Penford Gum 380 comprised 14.3 weight percent of the total formulation solids.

EXAMPLE 6

Astro® Gum 3020 oxidized carboxymethyl corn starch (Penford Products Co.) was dispersed in softened water and cooked at about 180–190° F. for about 15–20 minutes to produce a starch paste of about 22% ds. The paste was cooled to ambient temperature. A pressure sensitive adhesive composition and adhesive test sheets were prepared according to the procedure of Example 2. The Astro Gum 3020 comprised 15.1 percent by weight of the formulation solids.

EXAMPLE 7

About 400 g (as-is) of a hydroxypropyl tapioca starch of about 11% moisture content were dispersed in about 450 g of softened water. About 0.1 ml of α-amylase dispersion were added, and the mixture was cooked at 210° F. to produce a starch paste of about 45% ds. The paste pH was adjusted to about 1.8 with hydrochloric acid to destroy the enzyme, and then re-adjusted to about pH 7.0; the paste was cooled to ambient temperature. A pressure sensitive adhesive composition and adhesive test sheets were prepared according to the procedure of Example 2. The thinned derivatized starch comprised about 13.2 percent by weight of the formulation solids.

EXAMPLE 8

About 338 g (as-is) of a hydroxypropyl tapioca starch of about 11% moisture content was dispersed in about 500 g of softened water. About 390 mg of α-amylase dispersion was added, and the mixture was cooked at 180° F. for about 10 minutes to produce a starch paste of about 38% ds. The paste pH was adjusted to about 1.8 with hydrochloric acid to destroy the enzyme, and then re-adjusted to about pH 7.0; the paste is cooled to ambient temperature. A pressure sensitive adhesive composition and adhesive test sheets were prepared according to the procedure of Example 2. The thinned derivatized starch comprised about 14.3 percent by weight of the formulation solids.

The data in Table 1 show the following: (1) Pressure sensitive adhesives can be formulated with several different types of thinned derivatized starches. (2) The type of carbohydrate modification, carbohydrate molecular weight, and ratio of the carbohydrate to the synthetic polymer can be selected to manipulate the PSA properties. (3) The adhesive shear strength can be improved by increasing the ratio of thinned derivatized starch to synthetic polymer. (4) Thinned derivatized starches derived from hydroxyethyl corn starch and hydroxypropyl tapioca starch are particularly useful in this invention.

EXAMPLES 9 THROUGH 11

Examples 9 through 11 illustrate the effect of carbohydrate molecular weight on PSA properties. Specialty hydroxyethyl-substituted carbohydrates were prepared according to Example 1, except that the enzymatic hydrolysis was allowed to proceed for different times to obtain products of different molecular weights. Number 4415A is the highest molecular weight of the three, while 4415C is the lowest and 4415B is intermediate. The α-amylase thinned starch identified as 4415C is particularly preferred and is characterized by the molecular weight distribution illustrated in the High Performance Liquid Chromatography (HPLC) chart of FIG. 1. Specifically, the molecular weight distribution of the modified derivatized carbohydrate was measured by a Shimadzu HPLC system fitted with a Waters Untrahydrogel™ Linear column (Millipore Corp., Waters Chromatography Division) with a refractive index detector. The system was equipped with an in-line degasser and ultra-pure water used as the solvent with a flow rate of 1 mL/min. The sample was passed through a 0.45 micron filter before injecting it into the HPLC. The sample size was 100 μL of a 1% solution. The column temperature was 70° C. and the detector temperature was 40° C. The Shimadzu software provided with the machine was used to calculate the peak areas.

Pressure sensitive adhesive formulations were prepared according to the procedure of Example 2, except that the compositions shown in Table 2 were employed. Films were prepared by the procedure of Example 2, and loop tack, 180° peel strength and shear strength were determined. The data of Table 2 illustrate that loop tack and peel strength increase with decreasing carbohydrate molecular weight, while the shear strength decreases.

EXAMPLES 12 THROUGH 15

Pressure sensitive adhesive formulations were prepared according to the procedure of Example 2, except that the tackifier choice and amounts were varied as shown in Table 3. The loop tack, peel strength, and sheer strength were determined. As the data reported in Table 3 show, selection of the appropriate type and ratio of tackifier resins yields adhesives exhibiting a wide variety of properties.

EXAMPLES 16 THROUGH 20

Examples 16 through 20 compare adhesive formulations made with BASF Butofan NS 222 and with Mallard Creek Polymers Rovene® 5018 carboxylated SBR latexes. Example 16 is included as an example of one of the best overall formulations prepared according to this invention. The adhesives were prepared according to the procedure of Example 2, and loop tack and peel strength data were obtained. The data reported in Table 4 show that the better results are obtained with the Butofan NS 222, which is higher in carboxylic acid and butadiene content than the Rovene 5018.

EXAMPLE 21

Preparation of a Styrene-Butadiene-Thinned derivatized starch Copolymer

A styrene-butadiene-carbohydrate copolymer is prepared generally according to the teachings of U.S. Pat. No. 5,003, 022. A slurry of PenFilm™ HV hydroxyethyl-derivatized corn starch in water at 90–100° F. is prepared to a temperature-corrected density of about 19.8° Baume'. The pH is adjusted to 6.0–6.2, and sufficient calcium chloride dihydrate is added to provide about 20 ppm of calcium ion in solution. About 0.08% of an α-amylase suitable for use at high temperature (Spezyme-FRED®, available from Genencor) is added, and the slurry is passed through a jet cooker at about 230–235° F. The derivatized starch is passed through a conversion column with about 1.5 minute residence time and into a 1000-gal reactor until a total of about 700 kg of dry starch at about 32–33% solids is accumulated. The enzymatic conversion is allowed to proceed in the reactor at 195–205° F. until the starch paste has a viscosity of 125–165 Cp, as measured with a Foss Foods Rapid Visco Analyzer on a 30 g sample at 20° C. Sufficient sodium hypochlorite is added to destroy the enzyme and halt the reaction.

The resulting thinned derivatized starch dispersion is cooled to about 120° F., and about 18.4 kg of sodium persulfate are dissolved in the solution. About 407 kg of styrene is pumped into the reactor, which is then purged with nitrogen and pressure tested. Upon completion of the pressure test, about 293 kg of butadiene is transferred to the reactor by nitrogen pressure. The agitator is turned on, and the reactor contents are heated to about 158° F. in 2–2.5 hours. The temperature is maintained in the 157–163° F. range until the reactor pressure is less than 20 psig. The unreacted butadiene is vented, and about 9.2 kg of sodium persulfate are added. Heating is continued for about 4 to 5 hours to effect essentially complete reaction of the remaining styrene. The product is cooled to ambient temperature pH adjusted to about 4.5 and passed through a 100 μm filter.

COMPARATIVE EXAMPLE 22

A pressure sensitive adhesive formulation was prepared according to the procedure of Example 2 comprising the following: 44.4 parts by weight of BASF Butofan® NS 222 carboxylated SBR latex, 22.0 parts of the specialty hydroxyethyl-substituted carbohydrate, 16.3 parts of Snowtack® SE780G tackifier resin, and 16.3 parts of Aquatac® 6025 tackifier resin (available from Arizona Chemicals). Films were prepared as described in Example 2. Loop tack, 180° peel strength, and shear strength were determined, and are reported in Table 5. It was observed that the formulation began to separate into two phases less than two weeks after preparation.

EXAMPLE 23

A pressure sensitive adhesive formulation was prepared as in Example 22, except that 7.0 parts of the styrene-butadiene-carbohydrate copolymer of Example 21 were substituted for a like amount of the specialty hydroxyethyl-substituted carbohydrate. The test results, reported in Table 5, show that this product has higher shear strength than that of Comparative Example 22. It was also observed that this formulation did not separate into two phases when stored for over three months at ambient temperature.

EXAMPLE 24

A pressure sensitive adhesive composition was prepared as in Example 23, except that 16.3 parts of Aquatac 6085 tackifier resin was substituted for a like amount of the Snowtack SE780G. The data reported in Table 5 show that the loop tack is improved, with some reduction in the shear strength.

EXAMPLE 25

This example illustrates that the shear strength can be improved significantly by adding a crosslinking compound. Thus, a pressure sensitive adhesive composition was prepared as in Example 24, except that 1.0 part BASF Basonat® P LR 8878, a blocked isocyanate crosslinker, was added to the formulation. The data in Table 5 show that the shear strength is substantially increased compared with the product of Example 24.

EXAMPLES 26 THROUGH 30

Specialty hydroxyethyl-substituted carbohydrates were prepared according to the method of Example 1, varying the time of enzymatic hydrolysis to obtain products of four different molecular weights. Acrylic pressure sensitive adhesive formulations comprising BASF Acronal® A220 acrylic emulsion, the specialty hydroxyethyl-substituted carbohydrates, Aquatac 6025 tackifier, Aquatac 6085 tackifier, Surfynol® 440 surfactant (available from Air Products and Chemicals), and Surfynol DF75 defoamer (also available from Air Products and Chemicals) were prepared according to the procedure of Example 2. The loop tack, shear strength, and 180° peel strength were determined. The data reported in Table 6 show that the best overall properties were obtained with the specialty hydroxyethyl-substituted carbohydrate of lowest molecular weight.

EXAMPLES 31 THROUGH 34

These examples illustrate the use of several acrylic emulsions in this invention. Pressure sensitive adhesives were prepared according to the method of Example 2, using BASF Acronal A220, BASF Acronal 81D, and Franklin International Covinax® 331-00 acrylic emulsions in combination with specialty hydroxyethyl-substituted carbohydrate 44137F, Aquatac 6025 tackifier, Aquatac 6085 tackifier, Surfynol 440 surfactant, and Surfynol DF75 defoamer. Table 7 reports the properties of these products. It is seen that the properties can be controlled to produce various types of adhesive products by selection of the acrylic emulsion and tackifier to be used with the specialty hydroxyethyl-substituted carbohydrate 44137F.

EXAMPLE 35

This example illustrates the preparation of an acrylic-thinned derivatized starch copolymer.

About 935 g of Pen-cote® hydroxyethyl-derivatized starch (Penford Products Co.) was dispersed in about 1940 g of water, and 0.228 g of calcium chloride dihydrate was added. The mixture was heated to about 98° C. for about 30 minutes to cook the derivatized starch. The paste was allowed to cool to about 89° C. and 0.32 ml of α-amylase dispersion was added. The reaction was terminated after about 100 minutes by the addition of sodium hypochlorite. The resulting specialty hydroxyethyl-substituted carbohydrate paste (32.5% solids) was characterized by 89.6% of the product having chains of anhydroglucose units greater than seven units long (here after,%>dp=7).

A 332.3 g aliquot of the specialty hydroxyethyl-substituted carbohydrate paste (108 g dry solids) was transferred to a jacketed glass reaction vessel having ports for the addition of chemicals, a nitrogen purge line, thermocouple, reflux condenser, and agitator. To the reactor were added 2.52 g of Dowfax® 2A1 surfactant solution (available from The Dow Chemical Co.), 210.3 g of additional water and 0.10 g ethylene diamine tetraacetic acid disodium salt dihydrate. Hot water from a constant temperature bath was circulated through the jacket to maintain the temperature at about 65–68° C.

A mixture of 239.4 g of 2-ethylhexyl acrylate, 12.6 g of methyl methacrylate, and 0.378 g t-dodecyl mercaptan was prepared in a nitrogen-purged feed container, placed on a balance, and connected via a peristaltic pump to the reactor.

A solution of 2.52 g of sodium peroxydisulfate in 100 g of water was prepared in a separate nitrogen-purged container, placed on a balance, and connected to the reactor via a second peristaltic pump.

The reactor was purged with nitrogen for about one hour. Then 33.0 g of the sodium peroxydisulfate solution and 12.6 g of the monomer mixture were admitted to the reactor. After about 32 minutes, the initiator and monomer feed pumps were started. After about three hours, the addition of the initiator solution and monomer mixture was complete.

Solutions of about 0.20 g of t-butyl hydroperoxide in 5 g of water and 0.20 g of sodium formaldehyde sulfoxylate in 5.0 g of water were prepared. These were added to the reactor each in two increments about one hour and 1.5 hours after the monomer addition was complete to reduce the residual monomer level. The reaction was terminated about 30 minutes after the addition of the second increment of t-butyl hydroperoxide and sodium formaldehyde sulfoxalate. The acrylic-carbohydrate copolymer latex was cooled to ambient temperature, filtered through a 63 μm screen, and the pH was adjusted to about 6.3 with ammonium hydroxide. The final product solids were 40.3%.

EXAMPLE 36

An acrylic-thinned derivatized starch copolymer was prepared generally according to the procedure of Example 35, except that the specialty hydroxyethyl-substituted carbohydrate was enzyme-thinned PenFilm™ HV of 77.0%>dp=7, styrene was used in place of methyl methacrylate, dodecyl mercaptan was omitted and the other components are as shown in Table 8.

EXAMPLE 37

An acrylic-thinned derivatized starch copolymer was prepared generally according to the procedure of Example 35, except that the specialty hydroxyethyl-substituted carbohydrate was enzyme-thinned PenFilm™ HV of 90.8%>dp=7, styrene was used in place of methyl methacrylate, and the other components are as shown in Table 8.

EXAMPLE 38

A pressure-sensitive adhesive was prepared by combining about 74.1 parts (dry weight) of the acrylic-thinned derivatized starch copolymer of Example 35 with about 29.5 parts (dry weight) of Aquatac 6085 tackifier resin, using the procedure outlined in Example 2. The results are reported in Table 9.

EXAMPLES 39 AND 40

Pressure-sensitive adhesives were prepared by combining about 72.5 parts (dry weight) of the acrylic-thinned derivatized starch copolymer of Example 36 with about 25.4 parts (dry weight) of tackifier resin, using the procedure outlined in Example 2. The results are reported in Table 9. The products are suitable for use as removable pressure-sensitive adhesives.

EXAMPLES 41 AND 42

Pressure-sensitive adhesives were prepared by combining about 72.5 parts (dry weight) of the acrylic-thinned derivatized starch copolymer of Example 37 with about 25.4 parts (dry weight) of tackifier resin, using the procedure outlined in Example 2. The results are reported in Table 9. The products are suitable for use as removable pressure-sensitive adhesives.

TABLE 1

Styrene-Butadiene Based Pressure Sensitive Adhesives Prepared with Selected Modified Carbohydrates

| Example | 2 | 3 | 4 | 5 | 6 | 7 | 8 |
|---|---|---|---|---|---|---|---|
| BASF Butofan ® NS 222 carboxy-SBR latex | 52.5 | 46.0 | 57.5 | 57.3 | 56.8 | 2.5 | 57.3 |
| Penford Products Co. PenFilm ™ HV #421182 Enzyme-thinned Hydroxyethyl Specialty Carbohydrate | 13.2 | 19.7 | — | — | — | — | — |
| Penford Products Co. Clearsol ® 10 Oxidized Corn Starch | — | — | 14.0 | — | — | — | — |
| Penford Products Co. Penford ® Gum 380, Acid-thinned Hydroxyethyl Corn Starch | — | — | — | 14.3 | — | — | — |
| Penford Products Co. Astro ® Gum 3020 Oxidized Carboxymethyl Corn Starch | — | — | — | — | 15.1 | — | — |
| Enzyme-thinned Hydroxypropyl Tapioca Starch, HPT421178 | — | — | — | — | — | 13.2 | — |
| Enzyme-thinned Hydroxypropyl Tapioca Starch, HPT421174 | — | — | — | — | — | — | 14.3 |
| Akzo-Nobel Snowtack SE780G Tackifier | 34.3 | 34.3 | 28.5 | 28.4 | 28.1 | 34.3 | 28.4 |
| Shear Strength, min. (1/2" × 500 g) | 44 | 485 | — | — | — | 51 | 383 |
| 180° Peel Strength, g, 20 min. | 1147 | 404 | 673 | 1034 | 513 | 1285 | 992 |
| 180° Peel Strength, g, 4 hrs. | 1267 | 519 | 980 | 700 | 1122 | 1290 | — |
| 180° Peel Strength, g, 72 hrs. | 1454 | 540 | 1284 | 1037 | 950 | 895 | 1503 |
| Quick Stick, g | — | — | 86 | 160 | 86 | — | 1015 |

TABLE 2

Styrene-Butadiene Specialty Carbohydrate Pressure Sensitive Adhesives: Carbohydrate Molecular Weight Effects

| Example | 9 | 10 | 11 |
|---|---|---|---|
| BASF Butofan ® NS 222, carboxy-SBR latex | 44.4 | 44.4 | 44.4 |
| Enzyme-thinned Hydroxyethyl Specialty Carbohydrate #4415A | 15.0 | — | — |
| Enzyme-thinned Hydroxyethyl Specialty Carbohydrate #4415B | — | 15.0 | — |
| Enzyme-thinned Hydroxyethyl Specialty Carbohydrate #4415C | — | — | 15.0 |
| Akzo-Nobel Snowtack ® SE780G | 16.3 | 16.3 | 16.3 |
| Arizona Chemicals Aquatac ® 6025 | 16.3 | 16.3 | 16.3 |
| Loop Tack, g | 394 | 418 | 528 |
| 180° Peel Strength, g, 20 min. | 643 | 573 | 692 |
| 180° Peel Strength, g, 4 hrs. | 717 | 630 | 838 |
| 180° Peel Strength, g, 72 hrs. | 736 | 744 | 972 |
| Shear Strength, min., ½" × 500 g | 397 | 275 | 253 |

TABLE 3

Styrene-Butadiene- Specialty Carbohydrate Pressure Sensitive Adhesives: Effectiveness of Selected Tackifier Resins

| Example | 12 | 13 | 14 | 15 |
|---|---|---|---|---|
| BASF Butofan ® NS 222 carboxy-SBR latex | 45.4 | 43.4 | 40.0 | 43.4 |
| Enzyme-thinned Hydroxyethyl Specialty Carbohydrate Type 131 | 20.0 | 22.0 | 22.0 | 22.0 |
| Akzo-Nobel Snowtack ® SE780G tackifier | 32.6 | 24.5 | 16.3 | — |
| Akzo-Nobel Snowtack ® SE324G tackifier | — | — | 19.7 | — |
| Arizona Chemicals Aquatac ® 6025 tackifier | — | 8.2 | — | 16.3 |
| Arizona Chemicals Aquatac ® 6085 tackifier | — | — | — | 16.3 |
| Loop Tack, g | 150 | 335 | 379 | 487 |
| 180° Peel Strength, g, 20 min. | 476 | 773 | 1509 | 435 |
| 180° Peel Strength, g, 4 hrs. | 477 | — | 1588 | 514 |
| 180° Peel Strength, g, 72 hrs. | 2143 | 2094 | 1661 | 559 |
| Shear Strength, min., ½" × 500 g | 537 | 520 | 537 | 117 |

TABLE 4

Styrene-Butadiene Specialty Carbohydrate Pressure Sensitive Adhesives Effect of SBR Latex Selection

| Example | 16 | 17 | 18 | 19 | 20 |
|---|---|---|---|---|---|
| BASF Butofan ® NS 222 carboxy-SBR latex | 43.4 | 43.4 | — | — | — |
| Mallard Creek Polymers Rovene ® 5018 carboxy-SBR latex | — | — | 43.4 | 43.4 | 38.4 |
| Enzyme-thinned Hydroxyethyl Specialty Carbohydrate #421194A4 | 22 | 22 | 22 | 22 | 22 |
| Akzo-Nobel Snowtack ® SE780G tackifier | 16.3 | 16.3 | 16.3 | 5.0 | 16.3 |
| Akzo-Nobel Snowtack ® SE324G tackifier | — | 16.3 | 16.3 | 27.3 | 21.1 |
| Arizona Chemicals Aquatac ® 6025 tackifier | 16.3 | — | — | — | — |
| Loop Tack, g | 485 | 222 | 24 | 55 | 25 |
| 180° Peel Strength, g, 20 min. | 807 | 945 | 296 | 230 | 252 |
| 180° Peel Strength, g, 4 hrs. | 795 | 868 | 466 | 405 | 336 |
| 180° Peel Strength, g, 72 hrs. | 760 | 760 | 607 | 400 | 330 |

TABLE 5

Styrene-Butadiene-Specialty Carbohydrate Copolymer Pressure Sensitive Adhesives

| Example | 22 | 23 | 24 | 25 |
|---|---|---|---|---|
| BASF Butofan ® NS 222 carboxy-SBR latex | 43.4 | 44.4 | 44.4 | 44.4 |
| Enzyme-thinned Hydroxyethyl Specialty Carbohydrate #421131 | 22.0 | 15.0 | 15.0 | 15.0 |
| Styrene-butadiene-specialty carbohydrate copolymer from Example 21) | — | 7.0 | 7.0 | 7.0 |
| Akzo-Nobel Snowtack ® SE780G tackifier | 16.3 | 16.3 | — | — |
| Arizona Chemicals Aquatac ® 6025 tackifier | 16.3 | 16.3 | 16.3 | 16.3 |
| Arizona Chemicals Aquatac ® 6085 tackifier | — | — | 16.3 | 16.3 |
| BASF Basonat ® crosslinker | — | — | — | 1.0 |
| Loop Tack, g | 487 | 522 | 644 | 373 |
| 180° Peel Strength, g, 20 min. | 435 | 483 | 398 | 229 |
| 180° Peel Strength, g, 4 hrs. | 514 | 538 | 540 | 291 |
| 180° Peel Strength, g, 72 hrs. | 559 | 659 | 630 | 543 |
| Shear Strength, min., ½" × 500 g | 117 | 240 | 170 | 707 |

TABLE 6

Acrylic- Specialty Carbohydrate Pressure Sensitive Adhesives: Effect of Modified Carbohydrate Molecular Weight

| Example | 26 | 27 | 28 | 29 | 30 |
|---|---|---|---|---|---|
| BASF Acronal ® A220 acrylic emulsion | 53 | 53 | 53 | 53 | 51 |
| Enzyme-thinned Hydroxyethyl Specialty Carbohydrate #44137C | 20 | — | — | — | — |
| Enzyme-thinned Hydroxyethyl Specialty Carbohydrate #44137D | — | 20 | — | — | — |
| Enzyme-thinned Hydroxyethyl Specialty Carbohydrate #44137E | — | — | 20 | — | — |
| Enzyme-thinned Hydroxyethyl Specialty Carbohydrate #44137F | — | — | — | 20 | 22 |
| Arizona Chemicals Aquatac ® 6025 tackifier resin | 12.5 | 12.5 | 12.5 | 12.5 | 12.5 |
| Arizona Chemicals Aquatac ® 6085 tackifier resin | 12.5 | 12.5 | 12.5 | 12.5 | 12.5 |
| Loop Tack, g | 722 | 654 | 589 | 566 | 412 |
| 180° Peel Strength, g, 20 min. | 66 | 1128 | 304 | 469 | 344 |
| 180° Peel Strength, g, 4 hrs. | 116 | 346 | 353 | 451 | 328 |
| Shear Strength, min., ½" × 500 g | nd | 155 | nd | nd | 143 |

TABLE 7

Acrylic-Specialty Carbohydrate Pressure Sensitive Adhesives: Effect of Selected Acrylic Emulsions and Tackifiers

| Example | 31 | 32 | 33 | 34 |
|---|---|---|---|---|
| BASF Acronal ® A220 acrylic emulsion | 53 | 53 | — | — |
| BASF Acronal 81D acrylic emulsion | — | — | 53 | — |
| Franklin International Covinax 331-00 acrylic emulsion | — | — | — | 53 |
| Enzyme-thinned Hydroxyethyl Specialty Carbohydrate #44137F | 20 | 20 | 20 | 20 |
| Arizona Chemicals Aquatac ® 6025 tackifier resin | 12.5 | — | 12.5 | — |
| Arizona Chemicals Aquatac ® 6085 tackifier resin | 12.5 | 25.0 | 12.5 | 25.0 |
| Loop Tack, g | 841 | 413 | 381 | 765 |
| 180° Peel Strength, g, 20 min. | 669 | 47 | 402 | 1562 |

TABLE 8

Acrylic Specialty Carbohydrate Copolymer Latexes

| Example | 35 | 36 | 37 |
|---|---|---|---|
| Enzyme-thinned Hydroxyethyl Specialty Carbohydrate, 89.6% > dp = 7 | 30 | — | — |
| Enzyme-thinned Hydroxyethyl Specialty Carbohydrate, 77.0% > dp = 7 | — | 30 | — |
| Enzyme-thinned Hydroxyethyl Specialty Carbohydrate, 90.8% > dp = 7 | — | — | 30 |
| 2-Ethylhexyl Acrylate | 66.5 | 66.5 | 66.5 |
| Methyl Methacrylate | 3.5 | — | — |
| Styrene | — | 3.5 | 3.5 |
| t-Dodecyl Mercaptan | 0.105 | — | — |
| Sodium Persulfate | 0.7 | 2.0 | 2.0 |
| Water | 150 | 100 | 100 |
| Dowfax 2A1 | 0.7 | 0.7 | 0.7 |
| Temperature, ° C. | 65 | 80 | 80 |
| % Solids | 40.3 | 48.9 | 49.6 |

TABLE 9

Acrylic Specialty Carbohydrate Copolymer Pressure Sensitive Adhesives

| Example | 38 | 39 | 40 | 41 | 42 |
|---|---|---|---|---|---|
| Acrylic Carbohydrate Copolymer 418203 | 74.1 | — | — | — | — |
| Acrylic Carbohydrate Copolymer 442121 | — | 72.5 | 72.5 | — | — |
| Acrylic Carbohydrate Copolymer 442123 | — | — | — | 72.5 | 72.5 |
| Arizona Chemicals Aquatac ® 6085 tackifier resin | 25.9 | — | — | 25.4 | — |
| Arizona Chemicals Aquatac ® XR4257 tackifier resin | — | — | — | — | 25.4 |
| Neville Alliance Permatac ® H7120 tackifier resin | — | 25.4 | — | — | — |
| Neville Alliance Permatac ® NAI 2-5 tackifier resin | — | — | 25.4 | — | — |
| Quick Stick, g | 527 | — | — | — | — |
| Loop Tack, g | — | 859 | 514 | 670 | 540 |
| 180° Peel Strength, g, 20 min. | 521 | 319 | 134 | 43 | 31 |
| 180° Peel Strength, g, 6 hrs. | — | 236 | 124 | 86 | 26 |
| 180° Peel Strength, g, 72 hrs. | 866 | | | | |
| Shear Strength, min., ½" × 500 g | 5.6 | 78 | 28 | 280 | 141 |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A pressure sensitive adhesive composition comprising:
   (a) a synthetic polymer latex; and
   (b) an aqueous dispersion of enzyme thinned, derivatized starch which has an average molecular weight of from 360 to 50,000 daltons.

2. The adhesive composition of claim 1 wherein the thinned derivatized starch is substituted with a member selected from the group consisting of alkyl, hydroxyalkyl, allyl, aryl, arylalkyl, carbonyl, carboxylate, phosphate, and quaternary amine groups.

3. The adhesive composition of claim 2 wherein the hydroxyalkyl derivatized starch is a hydroxyethyl or hydroxypropyl starch.

4. The adhesive composition of claim 1 wherein the thinned derivatized starch is a hydroxyalkyl derivatized starch.

5. The adhesive composition of claim 1 further comprising a tackifier composition.

6. The adhesive composition of claim 1 wherein the synthetic polymer latex is selected from the group consisting of a styrene-butadiene copolymer latex, a carboxylated styrene-butadiene copolymer latex, an acrylic copolymer latex, a styrene-acrylic copolymer latex, and a vinyl acetate-acrylic copolymer latex.

7. The adhesive composition of claim 1 wherein the thinned derivatized starch comprises from 5 to 50 percent by weight on a dry solids basis of the total composition.

8. The adhesive composition of claim 1 wherein the thinned derivatized starch comprises from 10 to 40 percent by weight on a dry solids basis of the total composition.

9. The adhesive composition of claim 1 wherein the thinned derivatized starch comprises from 12 to 30 percent by weight on a dry solids basis of the total composition.

10. The adhesive composition of claim 1 wherein said composition comprises up to 35 percent by weight of tackifier resins.

11. The adhesive composition of claim 1 wherein said composition comprises up to 3.0 percent by weight of one or more surfactants.

12. The adhesive composition of claim 1 wherein said composition includes up to 1.0 percent by weight of defoamers.

13. The adhesive composition of claim 1 wherein said composition includes up to 4 percent by weight of a crosslinker.

14. A pressure sensitive adhesive composition comprising:
   (a) a synthetic polymer latex whose polymer component has a glass transition temperature of less than 0° C., and
   (b) an aqueous dispersion of enzyme thinned, derivatized starch.

15. A pressure sensitive adhesive composition comprising:
   (a) a synthetic polymer latex; and
   (b) an aqueous dispersion of enzyme thinned, derivatized starch; and
   (c) a starch copolymer composition.

16. The adhesive composition of claim 15 wherein the starch copolymer composition is a styrene-butadiene starch copolymer.

17. The adhesive composition of claim 16 wherein the starch copolymer composition is an acrylic starch copolymer.

* * * * *